Aug. 31, 1948.  E. L. SARGENT ET AL  2,448,280
INSULATING GEL
Filed Feb. 9, 1946

EDMUND L. SARGENT
ROBERT C. WILSON, JR.
INVENTORS

BY Oswald G. Hayes
ATTORNEY

Patented Aug. 31, 1948

2,448,280

UNITED STATES PATENT OFFICE 2,448,280

INSULATING GEL

Edmund L. Sargent and Robert C. Wilson, Jr., Woodbury, N. J., assignors to Socony-Vacuum Oil Company, Incorporated, a corporation of New York Application February 9, 1946, Serial No. 646,690

3 Claims. (Cl. 252—62)

This invention relates to a novel insulating material made up of a plurality of air cells having porous walls defined by inorganic oxide gels and to the method of making the same.

As is well known, thermal insulation of high efficiency can be prepared by forming a cellular solid. Typical of the newer materials of this type is the so-called foam glass which consists of what appears to be a mass of glass bubbles. Each of the bubbles surrounds a small air cell and the walls defining the many cells are so thin as to have very low heat conductivity in themselves. The mass therefore forms a very highly efficient thermal insulation. Glass wool has also been used for thermal insulation and is likewise a highly efficient thermal insulator of low bulk density. The glass insulations can only be made from molten glass and therefore require the use of high temperature equipment at the time of formation. For example, foam glass can be made by adding gas generating materials to a glass melt and glass wool is formed by flowing molten glass into a high velocity gas stream or through a suitable die. Inorganic synthetic thermal insulation can also be prepared by the aerogel technique as described in Kistler Patent No. 2,093,454. According to this process an inorganic oxide gel is prepared and the aqueous phase thereof is replaced by washing with alcohol or other organic liquid. The "alcogel" or the like is then heated to a temperature above the critical temperature of the liquid phase while maintaining a pressure sufficient to prevent evaporation of the liquid phase. Vapors of the liquid phase are then withdrawn at a temperature above the critical leaving an unshrunk gel structure of low bulk density. The aerogels so produced are very good thermal insulators but are highly susceptible to damage by moisture. Upon immersion in water, the aerogel crumbles leaving a very fine powder. A further disadvantage is that the aerogels are structurally very weak. They cannot be handled in bulk without substantial breakage and they will not carry any appreciable weight.

The present invention provides a mass in the nature of gel bubbles enclosing a large number of dead air cells each enclosed by a thin wall of porous inorganic oxide gel. Each of the air spaces is in very limited communication with the atmosphere in that gases can diffuse slowly through the walls and thus maintain equilibrium conditions between the air spaces and the atmosphere. Such diffusion is so very slow that it has no appreciable effect on the thermal insulating value of the mass. The foamy mass of gel is structurally strong and can support considerable weight and will also withstand normal handling. It is resistant to water damage such as breaks down the structure of aerogels and can be immersed in water without damage. It will be seen therefore that the present invention provides a novel product having the advantages of both foam glass and aerogels but lacking the disadvantages peculiar to either. From a process standpoint, the invention provides the further advantage that relatively low temperatures are employed, only slightly above the boiling point of water. This is to be compared with the molten glass temperatures of 1600 to 2200° F. and the high temperatures required by the aerogel process for operation above the critical temperature of alcohol or the like. Further objects and advantages of the invention will be apparent from detailed consideration thereof below in connection with the annexed drawings, wherein:

Briefly stated, the invention takes advantage of the fact that an inorganic oxide sol can be blown to a bubble and simultaneously gelled if certain critical conditions are observed. The prior copending application of Edmund L. Sargent, Serial No. 601,312, filed June 23, 1945, describes these condtions and a method for turning them to good account in the manufacture of a different type of product. Inorganic oxide sols may be formed over a wide range of conditions which result in the sol setting to a firm hydrogel upon the expiration of a suitable period of time. This gelation time varies with concentration, pH and temperature in a manner which has been described in the literature. In general, the gelation time decreases with increase in pH, temperature or concentration. At pH values somewhere around zero (one normal acidity), the gelation time reaches a maximum and then decreases with increasing acidity. The nature of this curve, particularly for silica gel, is discussed in Marisic et al. application Serial No. 500,938, filed September 2, 1943.

As the sol approaches gelation, it becomes more viscous and the viscosity continues to increase until the true gel is formed which will not flow and which does not reunite upon breaking. As disclosed in the said Sargent application, a sol of increased viscosity heated to a temperature above its boiling point under sufficient pressure to maintain liquid conditions, can be sprayed into a body of a fluid medium at a temperature above its boiling point to form hollow spheroids of firm hydrogel. Upon release of the pressure the liquid phase of the sol immediately vaporizes forming a sol bubble of considerable stability. The increase in temperature and the fact that the sol is already in the viscous stage and near gelation results in prompt gelling of the bubble wall to form an irreversible gel.

The present invention utilizes a similar principle but the sol is sprayed against a solid surface where the multitude of bubbles bond together at the time of gelation. This produces a light foamy mass consisting of a plurality of air spaces or air cells, each defined by a thin porous wall of inorganic oxide hydrogel.

Figure 1:
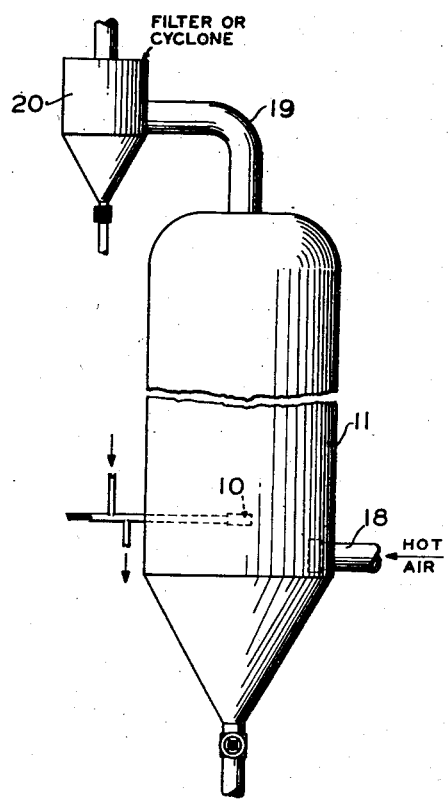
Figure 1 illustrates one type of apparatus used in forming the present product.
Figure 2:
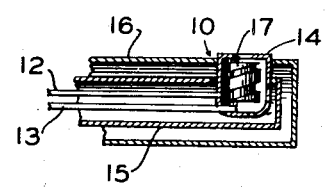
Figure 2 shows a nozzle for use in the apparatus of Figure 1.

Referring now to Figure 1, it may be noted that this apparatus is identical with that described in the said Sargent application. Operation of this apparatus results partly in practicing the process of that prior application and in part produces the product of the present invention. A viscous sol is sprayed from a nozzle 10, heated at a temperature above its boiling point at the pressure existing in a forming zone enclosed by a vertical chamber 11. As shown in Figure 2, the sol is preferably formed at the nozzle from preheated reactant solutions. If the sol is of such concentration and pH that it will have a very short gelation time at its boiling point, it will be viscous by the time it is ejected from the mixing nozzle 10. To achieve this purpose, two suitable reactant solutions are admitted from supply lines 12 and 13 to a mixing chamber 14. The supply lines and the mixing chamber are surrounded by a heating jacket consisting of two annular pipes 15 and 16 in communication at the mixing chamber. Thus, the solution supplied by lines 12 and 13 may be heated by hot oil flowing in the same direction in pipe 15 which is returned through the space between the pipes 15 and 16 to a suitable heater to be again raised to the desired temperature and recirculated. In the embodiment shown in Figure 2 the mixing chamber contains a cylindrical agitator 17 lying loosely within the mixing chamber 14. Because of helical grooves on the member 17 the same is caused to rotate by the liquid streams flowing through mixing chamber 14 thus promoting efficient mixing. The viscous superheated sol is ejected upwardly from the mixing nozzle 10 into vertical chamber 11 which is heated by hot air admitted at 18. In order to aid in insuring that the sol is not chilled by evaporation at the time of spraying, the atmosphere in chamber 11 is also maintained at a temperature above the boiling point of the sol at the pressure prevailing in this forming zone. A portion of the sprayed sol gels to hollow spheroids within the chamber 11 from which it may be conducted by pipe 19 to a separating device 20 such as a cyclone separator of filter. Another portion of the sol sprayed at 10 will form the product of the present invention by impinging upon the hot walls of the chamber 11. The viscous sol bubbles tend to flow together at points of contact forming a large number of cells separated by unitary walls of viscous sol which promptly sets to a gel giving a rigid structure which has a large number of cells bounded by porous walls.

Figure 3:
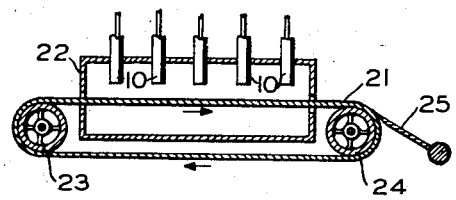
Figure 3 is a vertical cross section of the apparatus for continuously forming the product on a moving belt.

The present product can be formed continuously by spraying a sol from a plurality of mixing nozzles 10 on to the upper run of a moving belt 21 in an oven 22 (Figure 3). The oven 22 may be heated in any suitable manner as by circulation of hot air, electrical coils, or the like. The belt 21 is carried on drive wheels 23 and 24 and accumulates a thick deposit of the porous gel product while passing through the oven 22. If irregular pieces of the product are acceptable, the same may be permitted to break away from the belt as it bends upon conducting wheel 24 with the residue being removed by a scraper blade 25. Regular shaped blocks may be obtained by cutting the product from the belt as it leaves oven 22 or by other suitable means.

Figure 4:
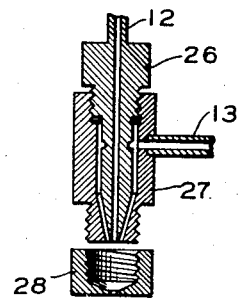
Figure 4 is a longitudinal section of a mixing nozzle for preparing and spraying the intermediate sol used in the process.
Figure 5:
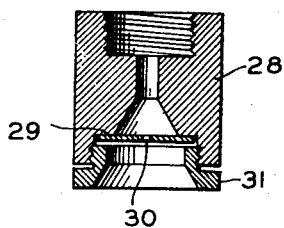
Figure 5 is a similar view of a modified tip for the nozzle of Figure 4.

A second satisfactory type of nozzle, particularly well suited to the apparatus of Figure 3, is shown in Figure 4. In this nozzle one reactant solution, from pipe 12, passes through a central bore in a block 26. The solution from line 13 passes through a space between block 26 and shell 27 to be ejected as an annular stream about the stream issuing from the central bore into a mixing space formed by a threaded adapter 28. A self-cleaning adapter is shown in Figure 5 as including a rubber diaphragm 29 having a central orifice 30 and held in place in the outlet of the adapter by member 31. This modified type of adapter provides for ejection of solid gel which may form from sol which remains within the mixing nozzle for a sufficient period of time to set to the rigid hydrogel state. Solid gel will tend to accumulate at the orifice 30 and pressure of liquid will then deform the diaphragm 29 and expand the orifice 30 to a sufficient extent to permit ejection of the rig'd gel thus clearing the orifice and permitting it to snap back into place to again act as a spray jet.

In a typical run, thermal insulating material of silica-alumina gel was prepared as follows: The silicate of soda solution was made by diluting "N" Brand silicate of soda with water to 15% $SiO_2$, 4% $Na_2O$ and 81% water by weight. The acid-alum solution contained approximately 4.6% aluminum sulfate, 3.4% sulfuric acid, and 92% water by weight. The two solutions were pumped through separate heat exchanger coils to preheat each liquid stream to about 290° F. The heated silicate and acid-alum streams were then mixed in a spray-type nozzle and sprayed upward from a nozzle placed in the bottom of a three ft. diameter, fourteen ft. high tower. The tower was heated to 600° F. with preheated air flowing from the bottom to the top of the tower.

The mixed solutions contained about 13.5% by weight solids whereas the dried gel deposited on the sides of the tower had a 92.5% weight solids concentration and a bulk density of 2 lbs. per cu. ft.

A portion of the freshly formed spray gel was put in water where it remained for six days without disintegrating. Another sample was water-washed free of soluble salts without an appreciable change in density.

It will be readily apparent to those skilled in the art that the invention is adapted to preparation of thermal insulation from gellable solutions of inorganic oxides which form irreversible hydrogels. Those gels of silica alone or in combination with any one of a large number of other oxides such as thoria, beryllia, zirconia, boric oxide, ferric oxide, calcium oxide, etc., can be employed as well as gels of other single oxides.

We claim:

1. A process for manufacture of a cellular mass which comprises forming a hydrosol of inorganic oxide having the inherent properties of setting to a hydrogel without change in chemical composition after the lapse of a period of time and of passing through a viscous state just prior to gelation, spraying said viscous sol against a solid surface in a forming zone, said forming zone being at a temperature in excess of the boiling point of said sol at the pressure of said forming zone, said sol being at a temperature in excess of its boiling point at the pressure of said forming zone and in said viscous state at the time of spraying as aforesaid; whereby the water content of said hydrosol is vaporized, expanding the drops of the hydrosol spray to bubbles which form a foamy mass on said surface and the walls of the bubbles bond together and set to firm hydrogel.

2. A process for manufacture of a cellular mass which comprises forming a hydrosol of inorganic oxide including silica having the inherent properties of setting to a hydrogel without change in chemical composition after the lapse of a period of time and of passing through a viscous state just prior to gelation, spraying said viscous sol against a solid surface in a forming zone, said forming zone being at a temperature in excess of the boiling point of said sol at the pressure of said forming zone, said sol being at a temperature in excess of its boiling point at the pressure of said forming zone and in said viscous state at the time of spraying as aforesaid; whereby the water content of said hydrosol is vaporized, expanding the drops of the hydrosol spray to bubbles which form a foamy mass on said surface and the walls of the bubbles bond together and set to firm hydrogel.

3. A process for manufacture of a cellular mass which comprises forming a hydrosol of inorganic oxide including silica and alumina having the inherent properties of setting to a hydrogel without change in chemical composition after the lapse of a period of time and of passing through a viscous state just prior to gelation, spraying said viscous sol against a solid surface in a forming zone, said forming zone being at a temperature in excess of the boiling point of said viscous sol at the pressure of said forming zone, said sol being at a temperature in excess of its boiling point at the pressure of said forming zone and in said viscous state at the time of spraying as aforesaid; whereby the water content of said hydrosol is vaporized, expanding the drops of the hydrosol spray to bubbles which form a foamy mass on said surface and the walls of the bubbles bond together and set to firm hydrogel.

EDMUND L. SARGENT.
ROBERT C. WILSON, Jr.

REFERENCES CITED

The following references are of record in the file of this patent:

UNITED STATES PATENTS

| Number | Name | Date |
| --- | --- | --- |
| 1,682,675 | Horsfield | Aug. 28, 1928 |
| 2,093,454 | Kistler | Sept. 21, 1937 |
| 2,102,849 | Kokatnur | Dec. 21, 1937 |
| 2,340,194 | McMullen | Jan. 25, 1944 |
| 2,384,945 | Marisic | Sept. 18, 1945 |
| 2,384,946 | Marisic | Sept. 18, 1945 |